US009621225B2

(12) United States Patent
Hessling et al.

(10) Patent No.: US 9,621,225 B2
(45) Date of Patent: Apr. 11, 2017

(54) DETECTION OF INBOUND SIGNALS IN THE VOLTAGE DOMAIN OF AN ELECTRICAL DISTRIBUTION NETWORK

(71) Applicant: Aclara Technologies LLC, Hazelwood, MO (US)

(72) Inventors: John B. Hessling, Hazelwood, MO (US); Mario K. Deschenes, Hazelwood, MO (US); Robert W. Richardson, Hazelwood, MO (US); Scot M. Gingerich, Hazelwood, MO (US)

(73) Assignee: Aclara Technologies LLC, Hazelwood, MO (US)

( * ) Notice: Subject to any disclaimer, the term of this patent is extended or adjusted under 35 U.S.C. 154(b) by 0 days.

(21) Appl. No.: 14/990,847

(22) Filed: Jan. 8, 2016

(65) Prior Publication Data

US 2016/0211886 A1 Jul. 21, 2016

Related U.S. Application Data

(60) Provisional application No. 62/103,710, filed on Jan. 15, 2015.

(51) Int. Cl.
 *H04B 3/54* (2006.01)
(52) U.S. Cl.
 CPC .................... *H04B 3/544* (2013.01)
(58) Field of Classification Search
 CPC ..................................................... H04B 3/544
 See application file for complete search history.

(56) References Cited

U.S. PATENT DOCUMENTS

| 5,486,805 | A | * | 1/1996 | Mak | H04B 3/544 |
|---|---|---|---|---|---|
| | | | | | 307/38 |
| 5,933,072 | A | * | 8/1999 | Kelley | H04B 3/14 |
| | | | | | 307/1 |
| 6,940,396 | B2 | | 9/2005 | Hammond et al. | |
| 8,040,251 | B2 | | 10/2011 | Spencer | |
| 8,401,093 | B2 | | 3/2013 | Spencer | |
| 8,456,285 | B2 | | 6/2013 | Spencer | |
| 8,761,271 | B2 | | 6/2014 | Spencer | |
| 2007/0211401 | A1 | * | 9/2007 | Mak | H02H 7/261 |
| | | | | | 361/119 |
| 2016/0285510 | A1 | * | 9/2016 | Hessling, Jr. | H04B 3/54 |

* cited by examiner

*Primary Examiner* — Kenneth Lam
(74) *Attorney, Agent, or Firm* — Polster, Lieder, Woodruff & Lucchesi, L.C.

(57) ABSTRACT

A method of two-way communications over a power distribution network in which outbound communication signals (O) and an inbound communication signals (I) modulate a time-varying waveform propagated through the network, on the low voltage side of the network. An outbound signal waveform is detected at a customer location (C) with remote communication equipment (RCE) at the customer location then producing a return or inbound communication signal. A corresponding inbound signal is produced in an associated voltage waveform and this signal is detected and processed by a distribution concentrator unit (DCU) at the sending end of the network. The transmission and detection of signals on the low voltage side of the network requires less energy than the generation, propagation, detection, and processing of signals on the high voltage side thereof.

10 Claims, 2 Drawing Sheets

DETECTION OF INBOUND SIGNALS IN THE VOLTAGE DOMAIN OF AN ELECTRICAL DISTRIBUTION NETWORK

CROSS REFERENCE TO RELATED APPLICATIONS

This application is based on and claims the benefit of U.S. provisional patent application 62/103,710 filed Jan. 15, 2015.

STATEMENT REGARDING FEDERALLY SPONSORED RESEARCH OR DEVELOPMENT

N/A

BACKGROUND OF THE INVENTION

This invention relates to a two-way automated communication system referred to as TWACS®; and, more particularly, to the detection of TWACS inbound communication signals transmitted over a sparsely populated power distribution network.

In TWACS parlance, an inbound signal is sent from a remote, customer site to a utility, often in response to an outbound signal sent from the utility to the customer site. TWACS detection of inbound signals has relied upon decoding a stream of data acquired from the time-varying current waveform propagated through the utility's power grid from a medium voltage level distribution substation. Such substations are, for example, 6 kV, 10 kV, 12.47 kV, etc. An inbound signal with its accompanying data is routed current transformers installed the network at appropriate locations and is provided to a TWACS receiver by an inbound signal pickup unit (IPU) at a receiving location.

This method of detection and processing works well and is cost effective for detecting TWACS signals at voltage distribution substations on a power grid having a substantial number of users; this being so because an IPU's cost can be amortized over the several thousand meters installed at customer sites throughout the grid. The same is not true, however, when the network's power grid is sparsely populated; that is, the power distribution system only has a low number of users. This is because the IPU's (or an equivalent device) cost is now too expensive to justify its use, particularly in low voltage distribution networks.

In addressing this problem it has been found that significant cost savings can be realized if TWACS inbound communication signals are detected in the voltage (rather than the current) domain; this being because only voltage needs to be supplied to signal receiving apparatus at a network substation. This significantly reduces the number of connections required to the utility's power distribution grid and this lowers operating costs.

BRIEF SUMMARY OF THE INVENTION

The present disclosure is directed to a method of sending, receiving, and processing communications sent over a utility communications system such as a TWACS®. In accordance with the method, an outbound signal is injected into the voltage waveform generated by the utility on the low voltage (secondary) side of a distribution service transformer. The modulated waveform propagates through the utility's power distribution network to a user site where the outbound communication is detected by remote communications equipment typically installed in the electrical meter located at the site. An inbound communication signal generated at the remote site in response to the outbound communication is transmitted back to the sending site on a current waveform. Appearance of the communication signal on the current waveform at the receiving end of the network produces a corresponding signal on the concurrent voltage waveform and this voltage waveform signal is now detected and processed to determine the content (data, response to a sent command, etc.) of the inbound communications.

A significant advantage of the present invention for communication systems is that both an outbound communication signal and an inbound communication signal are injected and detected by connection, in parallel, to the low voltage distribution network of the utility system without using current transformers which would otherwise require breaking into the network to install an in-line communications device. Such a device would require additional inputs to process the current waveforms.

The method of the invention is particularly useful where a power distribution network has relatively few users. It is also useful in areas, particularly foreign countries, where power distribution networks may consist of substantially fewer distribution transformers, there being substantially more utility customers per distribution transformer than in a U.S. power distribution network. In these low user networks, the ability to install substation communications equipment may be greatly limited. To address this issue, the present invention allows for installations where there are a large number of remote sites per distribution transformer. It does this by utilizing a distribution concentrator unit installed on the low voltage side of the power distribution network. By doing so, a TWACS signal, for example, does not need to traverse a utility's entire distribution network, from high voltage to low voltage for outbound signals; and then back again for inbound signals. A resulting benefit is that the amplitude of an injected TWACS signal required to produce an adequate signal for communication through the power distribution system is significantly reduced.

Other objects and features will be in part apparent and in part pointed out hereinafter.

BRIEF DESCRIPTION OF THE SEVERAL VIEWS OF THE DRAWINGS

The accompanying figures which, together with detailed description which follows, form part of the specification and illustrate the various embodiments described in the specification.

Corresponding reference characters indicate corresponding parts throughout the several views of the drawings.

DETAILED DESCRIPTION OF INVENTION

Figure 1:
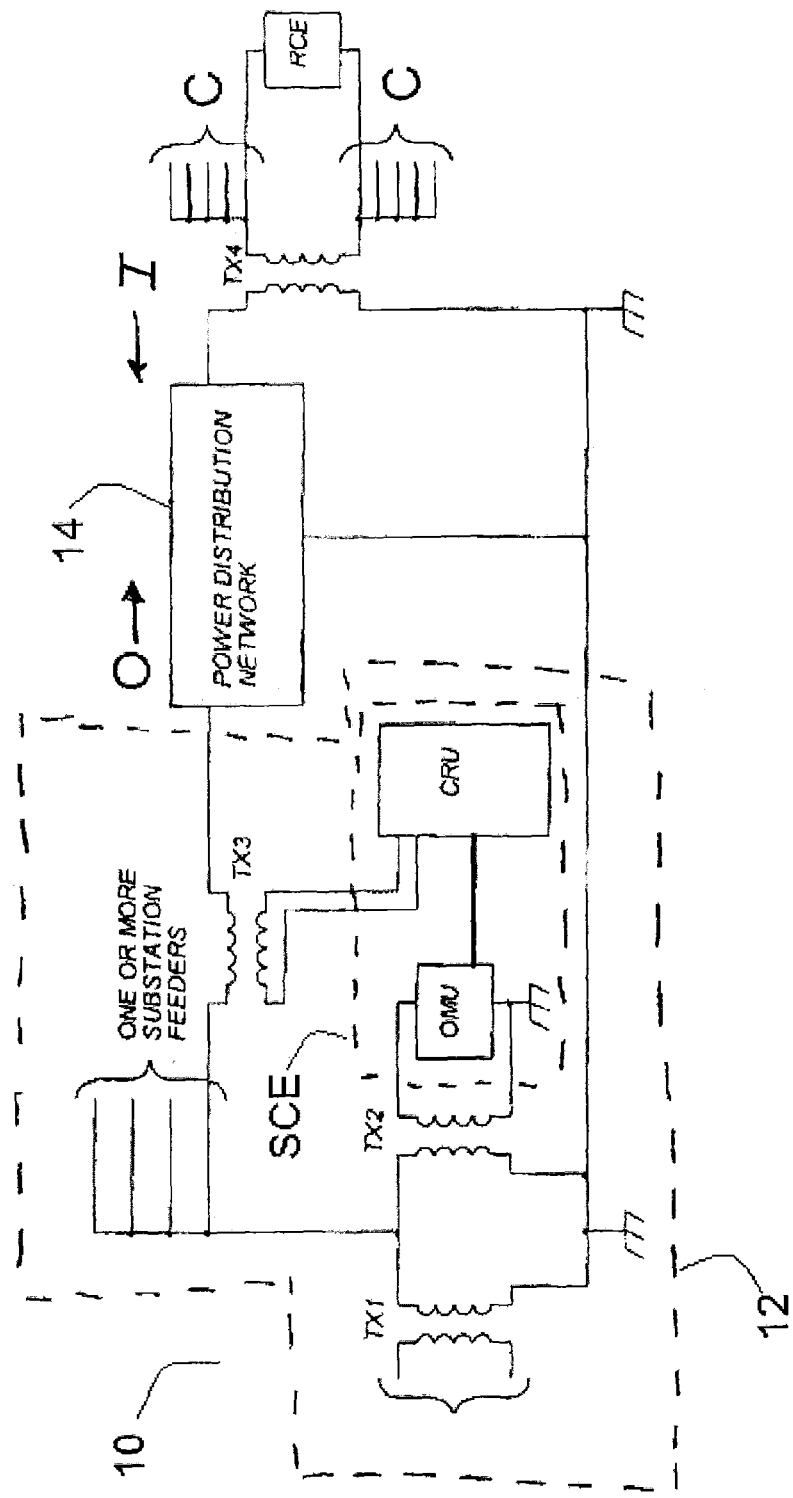
FIG. 1 is a simplified representation of a communication system, illustrating only one of the three phases, employing TWACS to communicate between a substation of a utility and a customer's site; and, FIG. 2 is a simplified representation of a system of the present invention, again illustrating only one of the three phases, for detecting, in the voltage domain, inbound signals sent over a TWACS from a customer's site to the utility.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Referring to FIG. 1, a power distribution system 10 supplies power to customers C located throughout a utility's power grid. In such systems 10, a two-way automated communications system, or TWACS®, may be employed. Using TWACS, an outbound communications signal O is transmitted from a substation 12 through the utility's power distribution network 14 to customer C locations, and a reply or inbound signal I is transmitted back from the customer locations to the substation.

Substation 12 typically contains one or more transformers TX1 which are used to step-down transmission voltages that are typically 35 kV or greater, to distribution voltages that are typically less than or equal to 35 kV. Substation 12 employs various protection equipment and outputs from the substation are connected to one or more of the utility's distribution networks 14. This equipment includes power factor correction equipment and regulator equipment (both not shown), and step-up and step-down transformers such as the high voltage transformers TX2 and TX3.

An outbound signal O is generated by substation communication equipment SCE installed at substation 12. As shown in FIG. 1, this equipment includes a control and receiving unit CRU and an outbound modulation unit OMU. The CRU generates or builds commands that are to be sent to a customer C's site. A power transformer TX2 is used in conjunction with the OMU to inject or impose the signal representing this command onto the generated voltage waveform so to modulate the waveform. The modulated voltage waveform is then being propagated through the power distribution network.

The outbound signals injected into the voltage waveform and transmitted over network 14 are received, detected, and processed by remote communication equipment RCE located at the customer/receiving end of power distribution system 10. The waveform into which the outbound signals O are injected are applied to the high voltage side of a transformer TX4 that steps down the waveform's high voltage to a low voltage level suitable for a customers use; i.e., 120V, 240V, 277V, etc.

It will be understood by those skilled in the art that an outbound communication signal O typically causes the RCE to perform various tasks at the customer site, one of which is generating and transmitting an inbound signal I back to the SCE at substation 12. The RCE incorporates various circuits and programs to perform these functions. An inbound signal I sent back through network 14 to substation 12 is coupled through transformer TX3 and supplied to the SCE for processing by the CRU.

As noted, the transformers are used in high voltage circuits of the network, and both the SCE and RCE operate at relatively high current levels to produce the respective outbound and inbound signals, O and I, detectable at the respective ends of the communications/TWACS system. Also, in many power distribution systems 10 employing TWACS, each substation, feeds many transformers TX4 that step down the high voltage distributed by the utility to the low voltage levels noted above for customers use. For utility systems in the United States that employ TWACS, there are typically few RCE points per distribution transformer and it has been found that this topology works well.

However, some power distribution systems, particularly those in foreign countries, differ significantly from those used in the United States. In these systems, a power distribution network may consist of substantially fewer distribution transformers and substantially more utility customers per distribution transformer. Accordingly, the ability to install TWACS SCE equipment in a utility's power distribution networks is somewhat limited.

Figure 2:
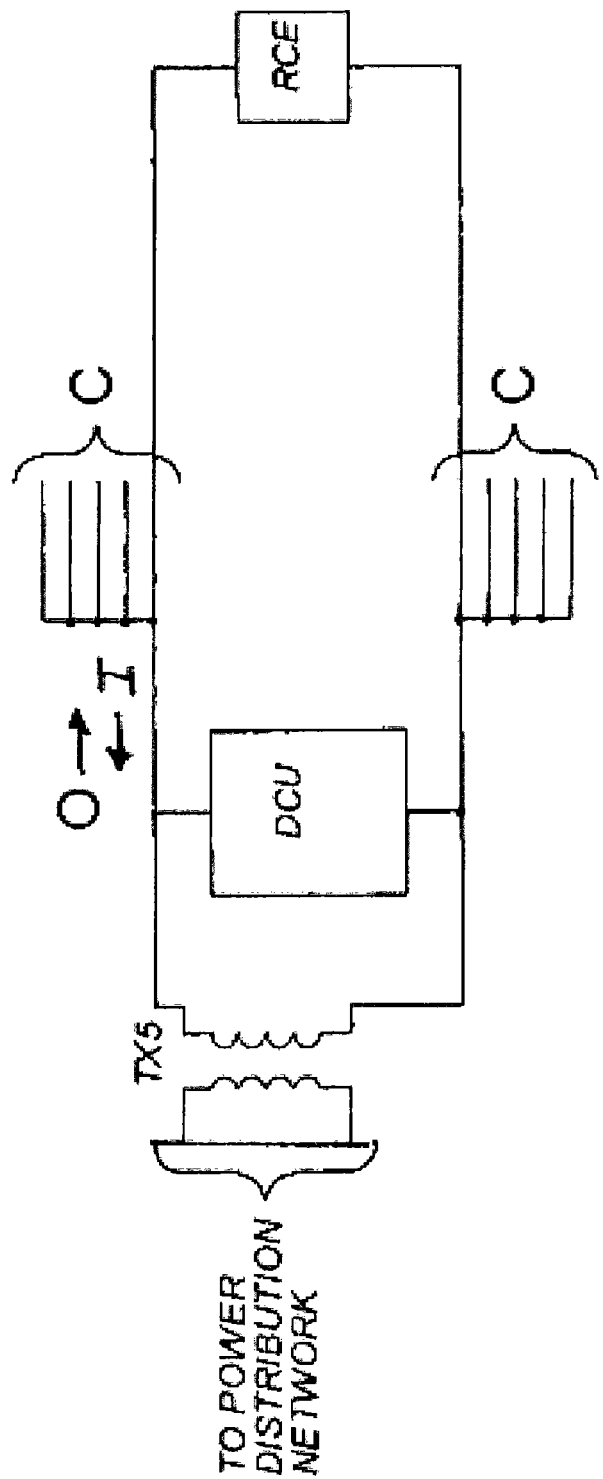

To address this situation, and as shown in FIG. 2, an improvement to the communication system now allows communication with a distribution concentrator unit DCU located on the low voltage side of power distribution network 14. This improvement is advantageous in that, now, a communications signal O or I does not have to traverse the utility's entire distribution network, from high-voltage to low-voltage for outbound signals O, and then back again for inbound signals I. The result is that the amplitude of the injected signal required to produce an outbound or inbound signal O or I for communications is significantly reduced.

In FIG. 2, outbound modulation is injected below (i.e., on the secondary side of) a distribution service transformer TX5. The modulation signals are produced by the DCU, and, as before, the resultant modulated voltage waveform is propagated through the low voltage distribution network to the RCE located at the customer end of distribution network 14. Also as before, in response to an inbound signal O, the RCE performs various tasks at the customer site, one of which is generating and transmitting an inbound signal I back to the DCU. The inbound signal I is carried on a current waveform back to transformer TX5 and the signal imposed on the current waveform produces a corresponding signal on the associated voltage waveform; and, this signal is detectable by the DCU.

Since the DCU is already connected to the voltage circuits, this modified voltage waveform is now acquired and processed by the DCU using algorithms similar to those used by the SCE located in a substation 12 to detect an inbound signal on a current waveform.

In the new application of the TWACS communication system, both the outbound communication signal and the inbound communication signal are injected into waveforms propagated through the network and subsequently detected by connecting, in parallel, to the low voltage side of the utility's power distribution network. And, this is accomplished without the need for current transformers that otherwise require breaking into a transmission path to install an inline device in place. It further eliminates the need for any additional inputs necessary to process the current waveforms.

In view of the above, it will be seen that the several objects and advantages of the present disclosure have been achieved and other advantageous results have been obtained.

Having thus described the invention, what is claimed and desired to be secured by Letters Patent is:

1. A method of two-way communications over a power distribution network in which an outbound signal is transmitted from a sending location over the network to a customer site and a reply, inbound communication is transmitted from the customer site over the network back to the sending location, comprising:
at the sending location, modulating a first time-varying waveform with the outbound signal in the voltage domain;
transmitting a resulting modulated waveform through the network to the customer site in the current domain;

at the customer site, detecting the outbound signal in the voltage domain and then processing the detected signal to determine the outbound signal's contents;

further at the customer site, modulating a second time-varying waveform with an inbound signal in the voltage domain;

transmitting a resultant modulated waveform through the network back to the sending location in the current domain; and, at the sending location, detecting the inbound signal in the voltage domain and processing the detected inbound signal to determine the inbound signal's contents whereby the energy required to detect and process the respective outbound and inbound signals in the voltage domain requires relatively less energy than if the respective outbound and inbound signals were detected and processed in the current domain.

2. The method of claim 1 in which the sending location includes a substation of the network having means by which the outbound signal is injected into the first time-varying waveform to modulate the waveform and for converting the modulated waveform from the voltage domain into the current domain for transmission to the customer site.

3. The method of claim 2 including means at the customer site for converting the first time-varying waveform with the outbound signal from the current domain back into the voltage domain for detection and processing of the outbound signal.

4. The method of claim 3 in which the means at the customer site further injects an inbound signal into a second time-varying waveform to modulate the second time-varying waveform in the voltage domain and converts the modulated waveform from the voltage domain into the current domain for transmission back to the substation.

5. The method of claim 4 in which the means at the substation converts the second time-varying waveform with the inbound signal from the current domain back into the voltage domain for detection and processing of the inbound signal.

6. The method of claim 5 in which the means at the customer site includes substation communications equipment (SCE) having an outbound signal modulation unit (OMU) for imposing an outbound signal on a first time-varying waveform and a control and receiving unit (CRU) for generating a signal to be sent to a customer site.

7. The method of claim 6 in which the means at the customer site includes remote communications equipment (RCE) for receiving, detecting, and processing an outbound signal and generating and transmitting an inbound signal.

8. The method of claim 2 in which an outbound signal is injected onto an outbound voltage waveform on a low voltage side of a distribution service transformer of the power distribution network located at the substation.

9. The method of claim 8 in which an inbound signal is injected onto a current waveform on the low voltage side of a distribution service transformer of the power distribution network located at the customer site.

10. The method of claim 9 for use in a two-way communications system employed in a sparsely populated power distribution network having relatively few distribution transformers and a relatively large number of utility customers per distribution transformer.

* * * * *